US012708987B2

(12) United States Patent
Herr et al.

(10) Patent No.: US 12,708,987 B2
(45) Date of Patent: Aug. 18, 2026

(54) HAND-HELD POWER TOOL

(71) Applicant: Robert Bosch GmbH, Stuttgart (DE)

(72) Inventors: Tobias Herr, Stuttgart (DE); Dietmar Saur, Moessingen (DE); Jens Blum, Filderstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 870 days.

(21) Appl. No.: 16/976,733

(22) PCT Filed: Feb. 4, 2019

(86) PCT No.: PCT/EP2019/052593
§ 371 (c)(1),
(2) Date: Sep. 24, 2020

(87) PCT Pub. No.: WO2019/170332
PCT Pub. Date: Sep. 12, 2019

(65) Prior Publication Data
US 2021/0252680 A1 Aug. 19, 2021

(30) Foreign Application Priority Data
Mar. 8, 2018 (DE) ........................ 102018203522.9

(51) Int. Cl.
*B25B 23/00* (2006.01)
*B25B 21/02* (2006.01)
*B25F 5/02* (2006.01)

(52) U.S. Cl.
CPC .......... *B25B 23/0035* (2013.01); *B25B 21/02* (2013.01); *B25F 5/02* (2013.01)

(58) Field of Classification Search
CPC ................................................. B25B 23/0035
See application file for complete search history.

(56) References Cited

U.S. PATENT DOCUMENTS

2014/0367928 A1* 12/2014 Yew ........................ B25B 21/02 279/9.1

FOREIGN PATENT DOCUMENTS

| | | | | |
|---|---|---|---|---|
| CN | 102917841 A | | 2/2013 | |
| CN | 103831799 A | | 6/2014 | |
| CN | 104057414 A | | 9/2014 | |
| CN | 207014254 U | | 2/2018 | |
| DE | 102013203121 A1 | | 8/2014 | |
| DE | 102013204782 A1 | * | 9/2014 | ........... B23B 1/1071 |
| EP | 2771151 B1 | | 9/2015 | |

(Continued)

OTHER PUBLICATIONS

International Search Report dated May 13, 2019 in connection with PCT/EP2019/052593.

*Primary Examiner* — Daniel Jeremy Leeds
(74) *Attorney, Agent, or Firm* — NORTON ROSE FULBRIGHT US LLP

(57) ABSTRACT

A hand-held power tool including a drive unit and including an output shaft, at which a tool holder is formed, which encompasses an internal polygonal holder for connection to a first insertion tool and an external polygonal holder for connection to a second insertion tool, a locking unit for locking the first insertion tool being assigned to the tool holder. It is provided that the locking unit includes at least one locking element, the locking element encompassing at least one contact surface, against which the second insertion tool rests.

14 Claims, 7 Drawing Sheets

(56) References Cited

FOREIGN PATENT DOCUMENTS

| | | | |
|---|---|---|---|
| KR | 101636689 | B1 | 7/2016 |
| KR | 20170048899 | A | 5/2017 |
| TW | 526107 | B | 4/2003 |

* cited by examiner

HAND-HELD POWER TOOL

FIELD

The present invention relates to a hand-held power tool.

BACKGROUND INFORMATION

European Patent No. EP 2 771 151 B1 describes a hand-held power tool including a drive motor, including a gear, including a striking mechanism, and including an output shaft, a tool holder being formed at the output shaft. The tool holder includes an internal polygonal holder and an external polygonal holder, the internal polygonal holder being designed for connection to an insertion tool. A locking device is assigned to the tool holder, the insertion tool being lockable with the aid of the locking device.

SUMMARY

The present invention is directed to a hand-held power tool including a drive unit and including an output shaft, at which a tool holder is formed, which encompasses an internal polygonal holder for connection to a first insertion tool and an external polygonal holder for connection to a second insertion tool. A locking unit for locking the first insertion tool is assigned to the tool holder. It is provided that the locking unit includes at least one locking element, the locking element encompassing at least one contact surface, which axially supports the second insertion tool.

The drive unit includes at least one drive motor and, in one specific embodiment, may include at least one gear. The drive motor may be designed, in particular, as at least one electric motor. The gear may be designed as at least one planetary gear set, the gear being, for example, shiftable. The present invention may also be utilized in conjunction with other motor types or gear types. Additionally, the hand-held power tool encompasses a power supply, the power supply being provided for a cordless operation with the aid of a rechargeable battery, in particular a hand-held power tool rechargeable battery pack, and/or for mains operation. In one preferred specific embodiment, the power supply is designed for a cordless operation. Within the scope of the present invention, a "hand-held power tool rechargeable battery pack" is to be understood as an integration of at least one rechargeable battery cell and a housing of a rechargeable battery pack. The hand-held power tool rechargeable battery pack is advantageously designed for the power supply for commercially available, cordless hand-held power tools. The at least one rechargeable battery cell may be designed, for example, as a Li-ion rechargeable battery cell having a nominal voltage of 3.6 V. By way of example, the hand-held power tool rechargeable battery pack may include up to ten rechargeable battery cells, another number of rechargeable battery cells also being possible. A specific embodiment as a cordless hand-held power tool as well as the operation as a mains-operated hand-held power tool are sufficiently conventional to those skilled in the art, and the details of the power supply will therefore not be dealt with here.

The drive unit is designed in such a way that it is actuatable with the aid of the manual switch. If the manual switch is actuated by a user, the drive unit is switched on and the hand-held power tool is put into service. If the manual switch is not further actuated by the user, the drive unit is switched off.

Preferably, the drive unit is electronically controllable and/or regulatable in such a way that a reversing mode and a specification for a desired rotational speed are implementable. It is also possible that the manual switch is a latchable manual switch, which is latchable in at least one position in at least one state of actuation.

The hand-held power tool is designed, in particular, as a rotary impact screwdriver. The rotary impact screwdriver includes at least one striking mechanism, in particular a rotary striking mechanism. The striking mechanism generates high torque peaks during operation, in order to loosen stuck fasteners or to tighten fasteners. The striking mechanism is connected to the drive motor with the aid of the gear. Additionally, the striking mechanism is connected to the output shaft.

The tool holder is formed at a free end of the output shaft, in particular in a direction pointing away from the drive unit. The tool holder encompasses an internal polygonal holder for connection to the first insertion tool. The internal polygonal holder may be designed, for example, as a hexagonal socket holder, so that the first insertion tool may be accommodated, by way of example, in the form of a screwdriver bit. Additionally, the tool holder encompasses the external polygonal holder for connection to the second insertion tool. The external polygonal holder may be formed, by way of example, as an external square holder. Here, it is made possible, by way of example, that the second insertion tool may be accommodated as a socket wrench. Such a screwdriver bit or socket wrench is sufficiently conventional in the related art, so that a detailed description will be dispensed with here.

In addition, the locking unit for locking the first insertion tool is assigned to the tool holder. As a result, a more secure and reliable operation of the hand-held power tool, in particular the rotary impact screwdriver, is made possible. According to the present invention, the locking unit encompasses the locking element. The locking element forms at least the contact surface, which axially supports the second insertion tool. The contact surface is formed, by way of example, in the direction pointing away from the drive unit, at the locking element as at least one end face transverse to a tool axis. Acting, in particular axial forces, upon the second insertion tool during the operation of the hand-held power tool may be reliably passed to the locking element, via the contact surface into the housing. As a result, a secure and reliable use of the second insertion tool with the hand-held power tool is made possible. In particular, the second insertion tool rests securely and reliably against the contact surface, regardless of a manufacturer of the second insertion tool.

The hand-held power tool includes the tool axis, a further tool axis also being provided. The tool axis may be designed, for example, as a rotation axis of the output shaft. In particular, "axial" is to be understood as essentially parallel to the tool axis. "Radial," however, is to be understood as essentially perpendicular to the tool axis.

Axial forces may occur during the operation of the hand-held power tool, for example, when the second insertion tool is connected to the external polygonal holder or, however, when a fastener is acted upon axially with the aid of the second insertion tool connected to the hand-held power tool. This typically takes place when the fastener is screwed in or tightened in or at a fastening support or, however, when the fastener is unscrewed or loosened.

The fastener may be a screw, a nut, or further comparable fasteners including a thread. The fastening support may be a plastic fastening support, such as a wall, a metal workpiece, or further comparable fastening supports. In addition, the fastening support may also encompass elastic fastening supports, such as a shaped part made of rubber.

Moreover, a length of a rotary percussion unit of maximally 140 mm, in particular maximally 130 mm, very particularly maximally 120 mm, is provided. The rotary percussion unit encompasses the drive unit, at least the striking mechanism and the locking unit. The length of the rotary percussion unit from a front end of the locking unit, in particular from the contact surface of the locking element, to a rear end of a motor shaft of the drive unit is maximally 140 mm, in particular 130 mm, very particularly 120 mm.

Advantageously, the locking element radially locks the first insertion tool and the second insertion tool rests axially against the locking element. Due to the radial locking of the first insertion tool, for example, the screwdriver bit, a secure and reliable fixation during the operation of the hand-held power tool is achieved. In the process, for example, the locking element engages into an at least partially circumferential groove of the first insertion tool and, as a result, locks the first insertion tool in the internal polygonal holder of the hand-held power tool. If the second insertion tool, for example, the socket wrench, is connected to the external polygonal holder, the second insertion tool rests axially against the locking element. The second insertion tool encompasses at least one connecting element for connection to the external polygonal holder. The connecting element may be formed at a back end of the second insertion tool. In a state of the second insertion tool connected to the external polygonal holder, the second insertion tool rests against the contact surface. The second insertion tool is then in immediate and direct contact with the locking element. As a result, the second insertion tool may absorb the axial forces and transmit them to the locking element with the aid of the contact surface. The transmission of the axial forces takes place securely and reliably in this case, in particular regardless of a design of the connecting element of the second insertion tool.

Preferably, the locking unit encompasses at least one setting element, against which the locking element rests and which directs axial forces into the output shaft. In one specific embodiment, the setting element is situated at the output shaft and is connected thereto in a form-locking and/or force-locked manner. The setting element may be, in this case, for example, a C-ring, a pin, a bolt, or further comparable setting elements. The output shaft encompasses at least one holder for accommodating the setting element. The holder may be designed, by way of example, as at least one recess, an at least partially circumferential groove, as a feed-through opening, or as a further comparable holder. In one specific embodiment, the locking element rests directly and immediately axially against the setting element. In the process, the axial forces, which were absorbed by the second insertion tool, may then be directly and immediately transmitted to the setting element.

Particularly advantageously, the locking unit encompasses at least one return element, in particular a spring element. The return element rests, in particular axially, against the setting element. The return element returns at least the locking element from an unlocking position, in which the first insertion tool is unlockable, into a locking position, in which the first insertion tool is lockable. The return element is situated, in particular axially, against the output shaft. In one specific embodiment, the output shaft may accommodate the return element and support it in such a way that the return element is axially movable. The return element may be designed, for example, as a spring element, in particular a spiral spring, further comparable return elements also being possible. The return element rests directly and immediately against the setting element. In addition, the return element rests indirectly against the locking element via a support element. The return element at least ensures that the locking element is displaced from the unlocking position into the locking position. In addition, the return element ensures that the locking element is preloaded in the locking position.

In order to unlock the first insertion tool, the locking element is moved, in particular, by the user. In one specific embodiment, the locking element is moved in the direction pointing away from the drive unit. It is also possible that the locking element is moved in a direction pointing toward the drive unit in order to be unlocked.

It is particularly preferred when the locking unit encompasses at least one support element, in particular a support sheet, against which the return element and the locking element rest. The support element is designed for supporting at least the return element and the locking element. In addition, the support element is situated at the output shaft and is axially movable in relation to the output shaft. In one specific embodiment, the support element may encompass at least one holder for accommodating the output shaft, the return element, and/or the locking element. In particular, the support element may encompass a feed-through opening as a holder for the output shaft. In addition, the support element encompasses at least one first support surface for supporting the return element. The return element rests axially against the support element and is acted upon by the return element. The support element also encompasses at least one second support surface for supporting the locking element. The second support surface accommodates the locking element, so that the locking element rests axially against the support element. The support element acts upon the locking element in the axial direction. If the locking element is displaced from the locking position into the unlocking position, the support element is essentially displaced in the same direction. The locking element and the support element carry out a coupled movement. The support element may be designed, for example, in the shape of a ring or a star, although comparable designs are also possible.

Very particularly preferably, the support element, in particular the support sheet, is designed in the shape of a cup. In this specific embodiment, the first support surface is axially and radially offset in relation to the second support surface.

In one alternative specific embodiment of the present invention, it is possible that the first support surface is radially or axially offset in relation to the second support surface.

In an advantageous way, the locking unit encompasses at least one actuating element, which accommodates the locking element, in particular in a form-locked manner. In one specific embodiment, the actuating element is formed as an actuating sleeve. The actuating element is designed for being actuated by the user. In particular, the user may move the locking element from the locking position into the unlocking position by actuating the actuating element. For this purpose, in one specific embodiment, the actuating element encompasses an external grip area, which the user may grip. In one specific embodiment, the actuating element may be designed to be thermally insulating, so that a low, in particular essentially no heat exchange is made possible between the locking element and the actuating element. This then makes it possible for the user to touch the actuating element, regardless of a duration of use of the hand-held power tool. In particular, in one specific embodiment, the actuating element encompasses at least one mounting element, in particular a mounting rib, at least for mounting the locking element.

It is possible that the actuating element accommodates the support element in a force-locked manner. For this purpose, for example, the actuating element may include snap-in hooks or a bayonet holder, in order to establish the force-locked connection.

In one particularly advantageous way, the actuating element includes an at least partially circumferential collar and the locking element includes an at least partially circumferential shoulder. The shoulder rests axially against the collar. In one specific embodiment, the collar is situated at a direction pointing away from the drive unit. In particular, the collar and the actuating element may be designed as one piece. In one specific embodiment, the shoulder is formed at the locking element. In particular, the collar and the shoulder are designed to be matching, in particular complementary, so that they are form-lockingly connectable to one another. The collar is formed in such a way that the shoulder rests axially against the collar and the locking element is then essentially axially movable when the actuating element is axially moved. In one alternative specific embodiment, it is possible that the collar and the shoulder are connected in a force-locked manner.

In a very advantageous way, at least one section of the locking element at least partially projects over the actuating element in an axial direction pointing away from the drive unit. In one specific embodiment, the locking element then forms at least one partially circumferential shoulder with respect to the actuating element. As a result, the contact surface of the locking element is at least partially shouldered in relation to the actuating element. This makes it possible for the second insertion tool to securely and reliably rest against the contact surface. In particular, due to the section of the locking element, a direct contact between the second insertion tool, in particular the connecting element of the second insertion tool, and the actuating element is avoided. Due to an axial overhang of the at least one section of the locking element with respect to the actuating element, it may be ensured that the axial forces may be passed into the output shaft in a controlled and immediate way via the locking element during operation of the hand-held power tool. This embodiment provides a reliable connection of the second insertion tool to the locking element, regardless of the manufacturer of the second insertion tool.

Preferably, the support element and the actuating element form a clamping connection with the aid of a fastening element of the locking unit. As a result, the support element is securely and reliably connected to the actuating element. In particular, it is ensured that, when the user actuates the actuating element, the support element is also actuated. In one specific embodiment, the support element is clamped between the fastening element and the actuating element. Typical fastening elements are, for example, a C-ring, a wedge, or further comparable fastening elements.

It is particularly preferred when the actuating element at least partially accommodates the fastening element in order to form the clamping connection, the fastening element resting against the support element. In one specific embodiment, the fastening element is accommodated by the actuating element in a form-locking and/or force-locked manner. As a result, the support element may then be clamped onto the actuating element and the locking element with the aid of the fastening element. In particular, the fastening element may hold the support element at the actuating element and simultaneously fix the support element at the locking element. Additionally, the locking unit, in particular the actuating element, encompasses at least one fixing element, which fixes the fastening element, in particular axially. The fixing element may be designed as at least one projection, a hook, or the like. By way of example, one, three, six or more than six fixing elements may be formed at the actuating element.

In one advantageous embodiment of the present invention, the actuating element encompasses at least one first internal holder for accommodating the locking element, a second internal holder for accommodating the support element, and a third internal holder for accommodating the fastening element. For this purpose, the locking element is designed to be matching, in particular complementary, with respect to the first internal holder. In particular, the first internal holder accommodates the locking element in a form-locking and/or force-locked manner. The second internal holder additionally encompasses an at least partially circumferential shoulder. The support element is designed to be matching, in particular complementary, with respect to the second internal holder. The second internal holder may accommodate the support element in a form-locking and/or force-locked manner, the support element additionally resting against the shoulder. Therefore, the support element rests against the actuating element radially as well as axially with the aid of the second internal holder. The fastening element is designed to be matching, in particular complementary, with respect to the third internal holder. The third internal holder accommodates the fastening element in a form-locking and/or force-locked manner.

In one preferred embodiment of the present invention, the locking element encompasses at least one locking body, the locking element locking the locking body. The locking element is movable at least axially and the locking body is movable at least radially. In particular, in one specific embodiment, the locking element locks the locking body in the locking position. Moreover, the locking body locks the first insertion tool in the locking position. When the locking element is moved axially into the unlocking position, the locking body is unlocked. In one specific embodiment, in the unlocking position, the locking body is radially movable and the first insertion tool is removable from the internal polygonal holder.

In one particularly preferred embodiment of the present invention, the locking element is designed as a locking ring and the locking body is designed as at least one locking pin. It is also possible that the locking body is formed as at least one locking bolt or a locking ball.

BRIEF DESCRIPTION OF THE DRAWINGS

The present invention is explained in the following with reference to preferred specific embodiments.

DETAILED DESCRIPTION OF EXAMPLE EMBODIMENTS

Figure 1:
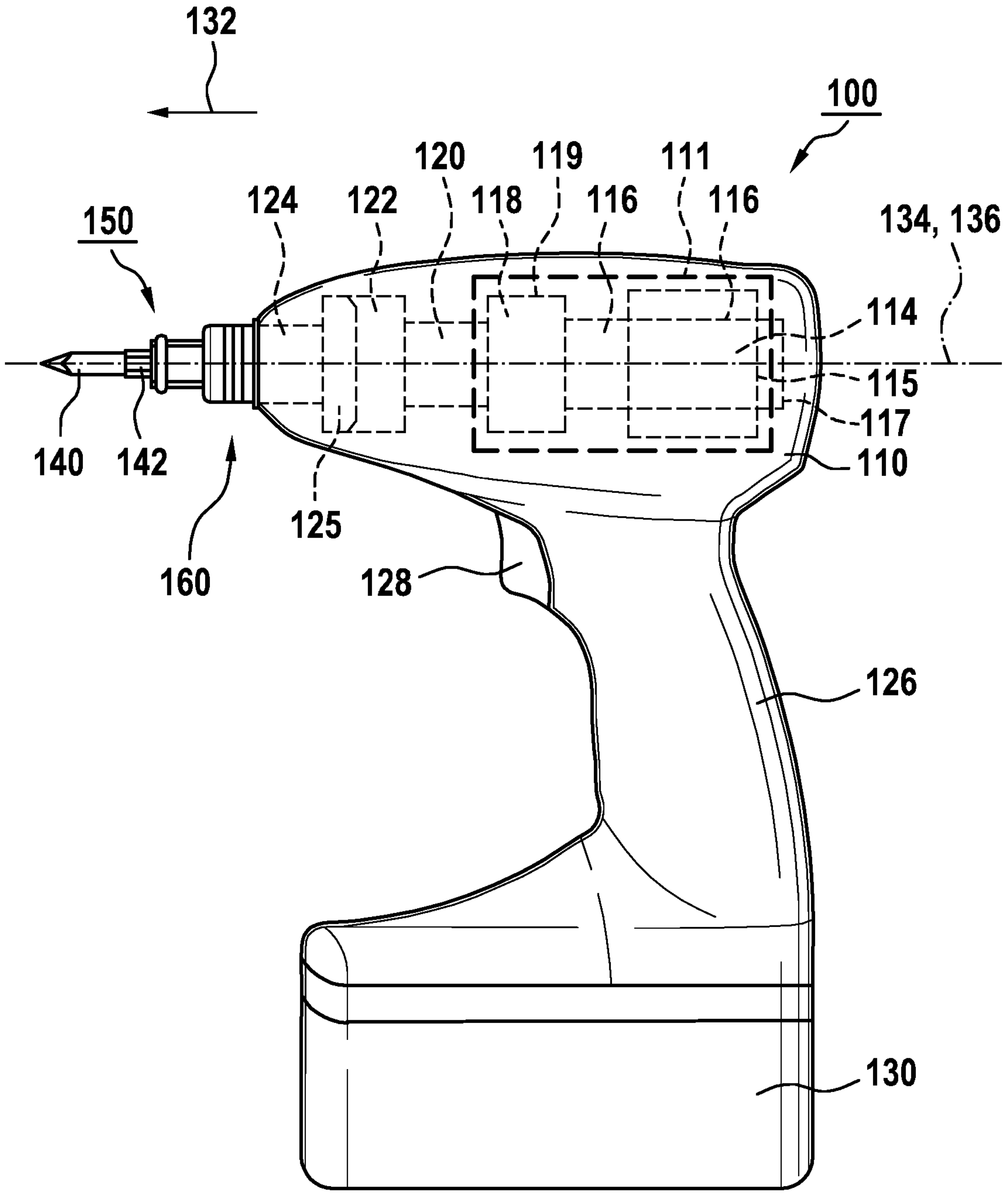
FIG. 1 shows a schematic view of a hand-held power tool according to an example embodiment of the present invention including a tool holder.

FIG. 1 shows a hand-held power tool 100 according to the present invention, hand-held power tool 100 being designed as an exemplary cordless rotary impact screwdriver in this case. Hand-held power tool 100 encompasses an output shaft 124, a tool holder 150, and an exemplary striking mechanism 122, for example, a rotary striking mechanism. Hand-held power tool 100 encompasses a housing 110 including a handle 126. For battery-supplied power, hand-held power tool 100 is mechanically and electrically connectable to a power supply for cordless operation, so that hand-held power tool 100 is designed as a cordless hand-held power tool 100. A hand-held power tool rechargeable battery pack 130 is utilized as a power supply in this case. The present invention is not limited to cordless hand-held power tools, however, but rather may also be utilized in the case of mains-dependent, i.e., mains-operated hand-held power tools or pneumatically operated hand-held power tools. In this specific embodiment, hand-held power tool 100 includes a tool axis 134. Tool axis 134 is designed as a rotation axis 136 of output shaft 124 in this case.

As shown, housing 110 encompasses a drive unit 111 and striking mechanism 122. Moreover, drive unit 111 encompasses an electric drive motor 114, which is supplied with current by hand-held power tool rechargeable battery pack 130, and a gear 118. Gear 118 may be designed as at least one planetary gear set. Drive motor 114 is designed in such a way that it is actuatable, for example, with the aid of a manual switch 128, so that drive motor 114 is switchable on and off. Drive motor 114 may be an arbitrary motor type, such as an electronically commutated motor or a DC motor. Advantageously, drive motor 114 is electronically controllable and/or regulatable, so that a reversing mode, as well as a desired rotational speed, are implementable. The configuration and the mode of operation of a suitable drive motor are sufficiently conventional to those skilled in the art, which is why they will not be dealt with in greater detail here.

Gear 118 is connected to drive motor 114 via a motor shaft 116. Gear 118 is provided for converting a rotation of motor shaft 116 into a rotation between gear 118 and striking mechanism 122 via a drive element 120, for example, a drive shaft. Preferably, this conversion takes place in such a way that drive element 120 rotates in relation to motor shaft 116 with increased torque, but at a reduced rotational speed. As demonstrated, a motor housing 115 is assigned to drive motor 114, similarly to a gear housing 119 assigned to gear 118. Motor housing 115 as well as gear housing 119 are situated in housing 110 by way of example. It is also possible, however, that drive motor 114 and gear 118 may be situated directly in housing 110 when hand-held power tool 100 is formed in an "open frame" design.

Striking mechanism 122 is connected to drive element 120 and encompasses, by way of example, an impact body 125, which generates impact-like angular momentum with high intensity. Via impact body 125, this impact-like angular momentum is transmitted to output shaft 124, for example, a working spindle. Striking mechanism 122 encompasses a striking mechanism housing 123 (see FIG. 3), striking mechanism 122 also being situated in another suitable housing, such as gear housing 119.

Exemplary striking mechanism 122 is designed for driving output shaft 124. A tool holder 150 is provided at output shaft 124. Preferably, tool holder 150 is molded and/or formed at output shaft 124. In this specific embodiment, tool holder 150 is situated in an axial direction 132 facing away from drive unit 111. In this specific embodiment, a locking unit 160 for locking a first insertion tool 140 is assigned to tool holder 150. Preferably, output shaft 124 is designed as one piece with tool holder 150. Tool holder 150 encompasses an internal polygonal holder 152 for connection to first insertion tool 140; see also FIGS. 2 and 3. Additionally, tool holder 150 encompasses an external polygonal holder 156 for connection to a second insertion tool 144; see also FIGS. 2, 3 and 5. In this specific embodiment, internal polygonal holder 152 is formed in the manner of a bit holder encompassing a hexagonal socket holder 154 and is designed for accommodating first insertion tool 140 in the manner of a screwdriver bit. For this purpose, first insertion tool 140 encompasses a matching external hexagonal coupling 142. The type of the screwdriver bit, for example, of the HEX type, is sufficiently conventional to those skilled in the art. The present invention is not limited to a use of HEX screwdriver bits, however, but rather further first insertion tools appearing meaningful to those skilled in the art may also be used, such as HEX drill bits or SDS quick-change insertion tools. In this specific embodiment, external polygonal holder 156 is designed as an external square holder 158. External square holder 158 is designed for accommodating second insertion tools 144 encompassing a hexagonal socket holder 146, such as a socket wrench. Such a socket wrench encompassing a hexagonal socket holder is sufficiently conventional in the related art.

Moreover, hand-held power tool 100 according to the example embodiment of the present invention has a length of a rotary percussion unit of maximally 140 mm, in particular maximally 130 mm, very particularly maximally 120 mm. The rotary percussion unit encompasses drive unit 111, striking mechanism 122, and locking unit 160. The length of the rotary percussion unit from a front end of locking unit 160 to a rear end 117 of motor shaft 116 of drive unit 111 is maximally 140 mm, in particular 130 mm, very particularly 120 mm. In this specific embodiment, the front end of locking unit 160 is a contact surface 168 of a locking element 162.

Figure 2:
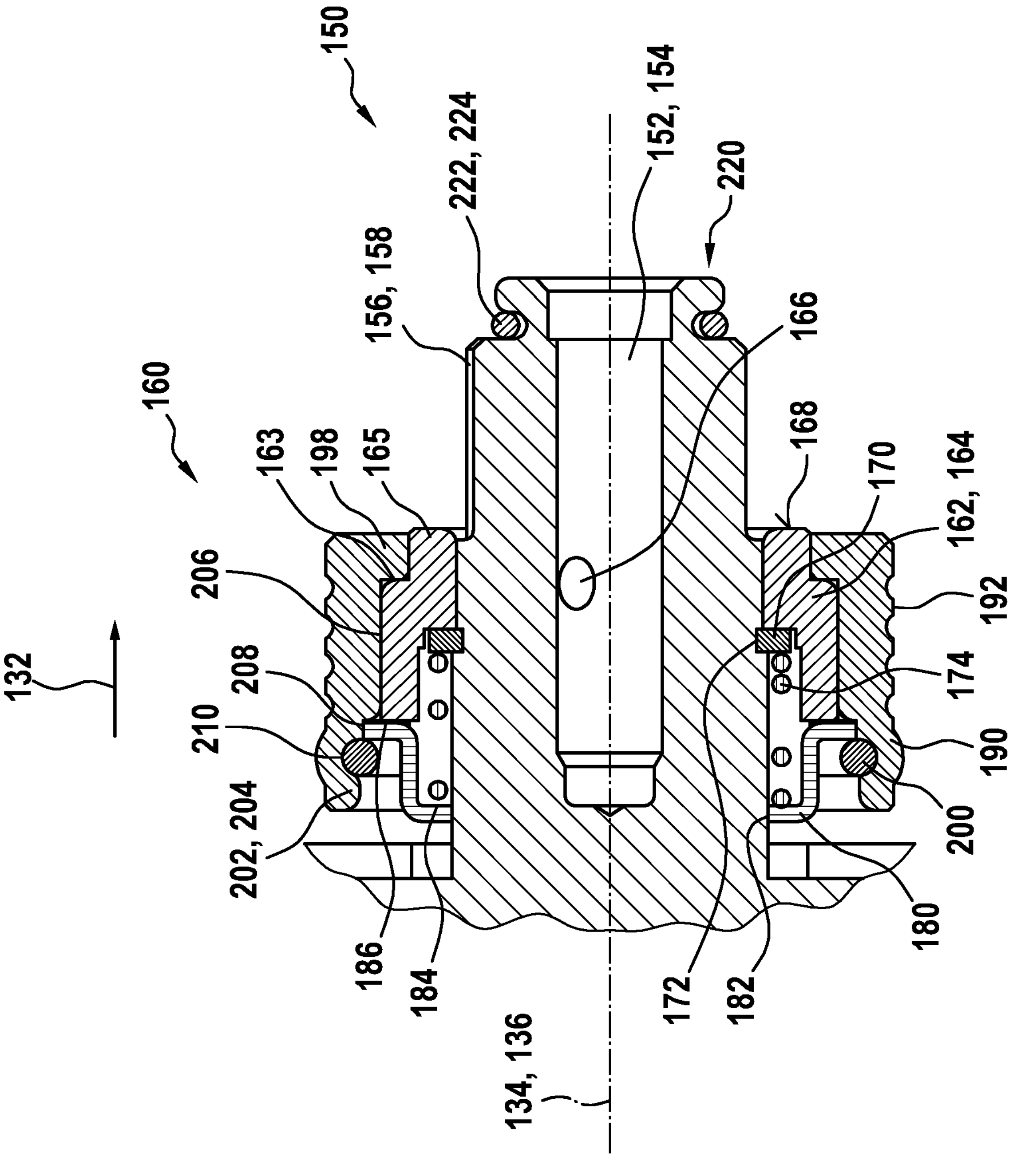
FIG. 2 shows a sectional view of the tool holder of the hand-held power tool.

In FIG. 2, a sectional view of tool holder 150 of hand-held power tool 100 according to the example embodiment of the present invention is shown. In axial direction 132 pointing away from drive unit 111, output shaft 124 according to this specific embodiment encompasses an axial expansion 220. This is preferably molded at tool holder 150 and is designed as one piece therewith in this specific embodiment. Axial expansion 220 includes a preferably elastically deformable holding element 222. As demonstrated, this encompasses a fixing element 224, which is preferably designed as an elastically deformable, metal C-ring.

Figure 3:
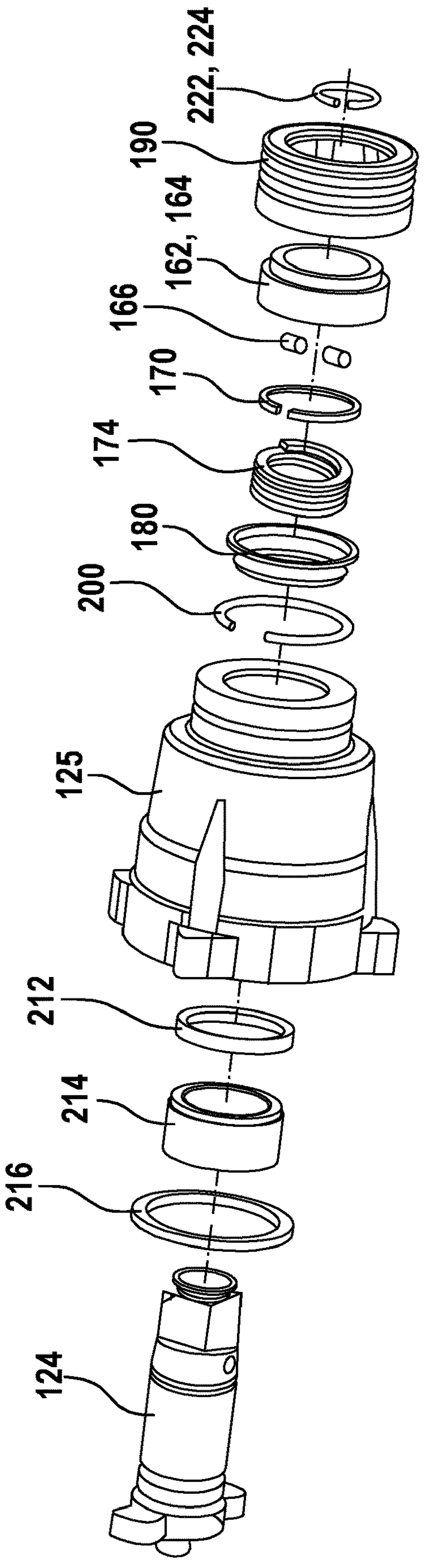
FIG. 3 shows an exploded view of the tool holder of the hand-held power tool.
Figure 4A:
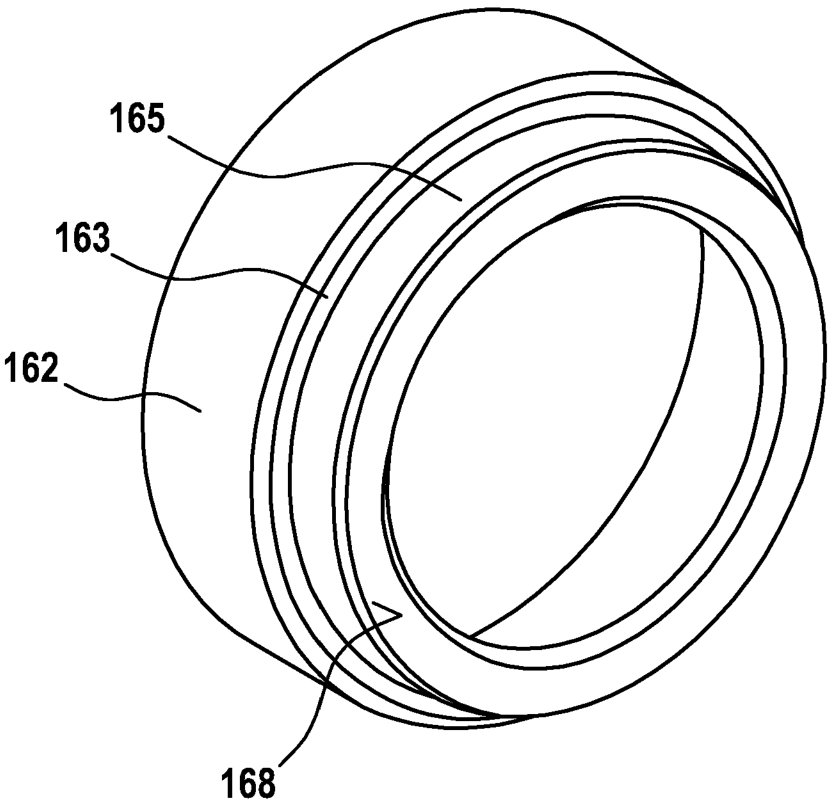
FIG. 4*a* shows a perspective view of a locking element.

Locking unit 160 encompasses locking element 162; see also FIG. 4*a*. Locking element 162 encompasses at least one locking body 166; see also FIG. 3. Locking element 162 is designed as a locking ring 164 in this specific embodiment. Locking body 166 is designed as a locking pin, locking unit 160 encompassing two locking pins; see also FIG. 3. Locking element 162 cooperates with locking body 166, locking body 166 being mounted in a radially displaceable manner. In a locking position, locking element 162 locks locking body 166, so that first insertion tool 140 is locked in internal polygonal holder 152 via locking body 166. In an unlocking position, locking element 162 unlocks locking body 166, so that it is radially movable. In the unlocking position, first insertion tool 140 is removable from internal polygonal holder 152.

In addition, locking element 162 encompasses contact surface 168, against which the second insertion tool rests. In this specific embodiment, contact surface 168 is designed at locking element 162 in axial direction 132 pointing away from drive unit 111 and is formed by an end face of locking element 162. Second insertion tool 144 rests against contact surface 168 of locking element 162. In addition, locking element 162 encompasses a section 165, which partially projects over actuating element 190 in axial direction 132 pointing away from drive unit 111.

In this specific embodiment of the present invention, locking unit 160 encompasses a setting element 170, against which locking element 162 rests. As a result, axial forces, which locking element 162 has absorbed, are guided into output shaft 124. Locking element 162 rests directly and immediately axially against setting element 170. Setting element 170 is designed as a metal C-ring. Setting element 170 is situated at output shaft 124 and is connected thereto in a form-locking manner. Output shaft 124 encompasses a holder 172 for accommodating setting element 170. Holder 172 is formed as a circumferential groove.

Locking unit 160 also encompasses a return element 174, which is designed as a spiral spring in this case. Return element 174 rests axially against setting element 170. Here, return element 174 acts upon setting element 170 in the axial direction. In addition, return element 174 is movably situated at output shaft 124, output shaft 124 accommodating return element 174.

Locking unit 160 encompasses a support element 180, against which return element 174 and locking element 162 rest. Support element 180 supports return element 174 and locking element 162. Support element 180 is designed as a support sheet. Moreover, support element 180 is situated at output shaft 124 and is axially movable in relation to output shaft 124. Support element 180 encompasses holders 182, 184, 186 for accommodating output shaft 124, return element 174, and locking element 162; see also FIG. 4*b*. Holder 182 of support element 180 for output shaft 124 is designed as a feed-through opening 183; see also FIG. 4*b*. Holder 184 of support element 180 for return element 174 is formed as a first support surface 185; see also FIG. 4*b*. Holder 186 of support element 180 for locking element 162 is formed as a second support surface 187; see also FIG. 4*b*. In this specific embodiment, support element 180 is formed in the shape of a cup; see also FIG. 4*b*. In this case, first support surface 185 is axially and radially offset in relation to second support surface 187; see also FIG. 4*b*.

In addition, locking unit 160 encompasses an actuating element 190, which accommodates locking element 162 in a form-locking manner. Actuating element 190 is designed as an actuating sleeve; see also FIG. 4*c*. Actuating element 190 encompasses an external grip area 192, which a user may grip. In addition, actuating element 190 encompasses mounting elements 194, which mount locking element 162 at actuating element 190; see FIG. 4*c*. Mounting elements 194 are formed as mounting ribs 196.

Figure 4B:
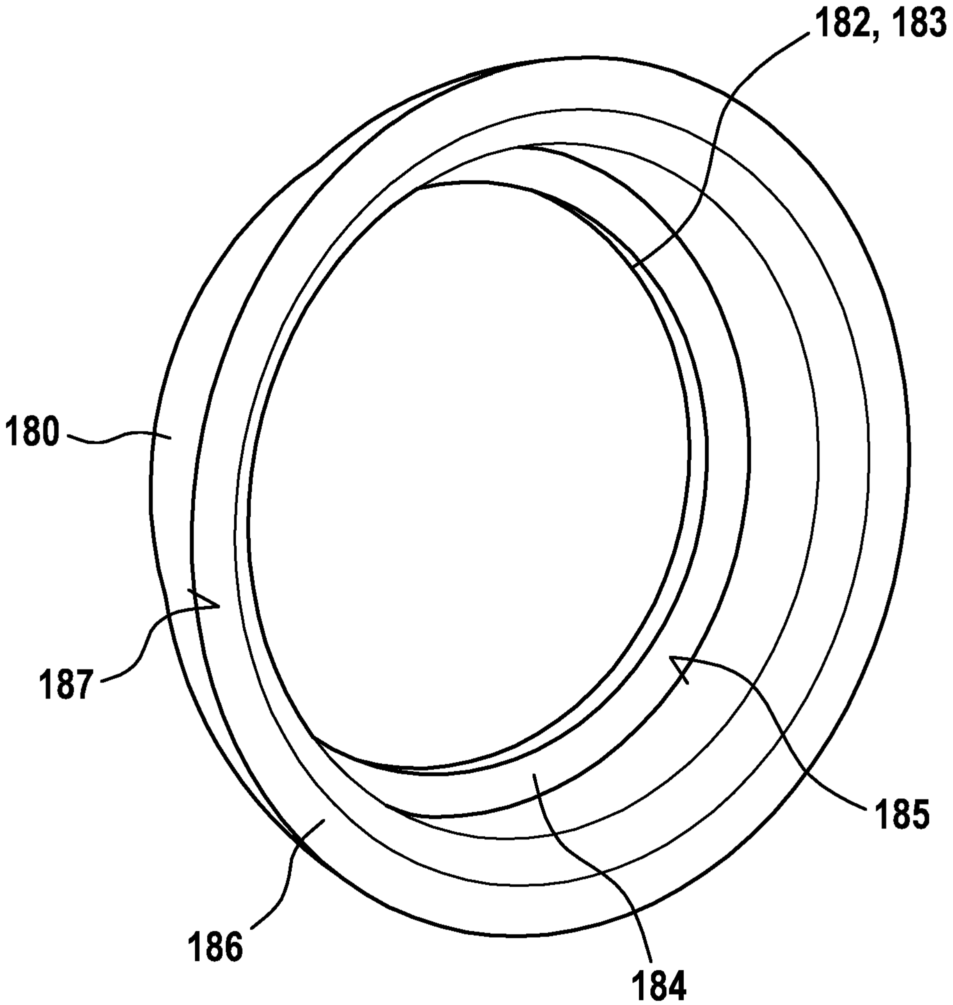
FIG. 4*b* shows a perspective view of a support element.
Figure 4C:
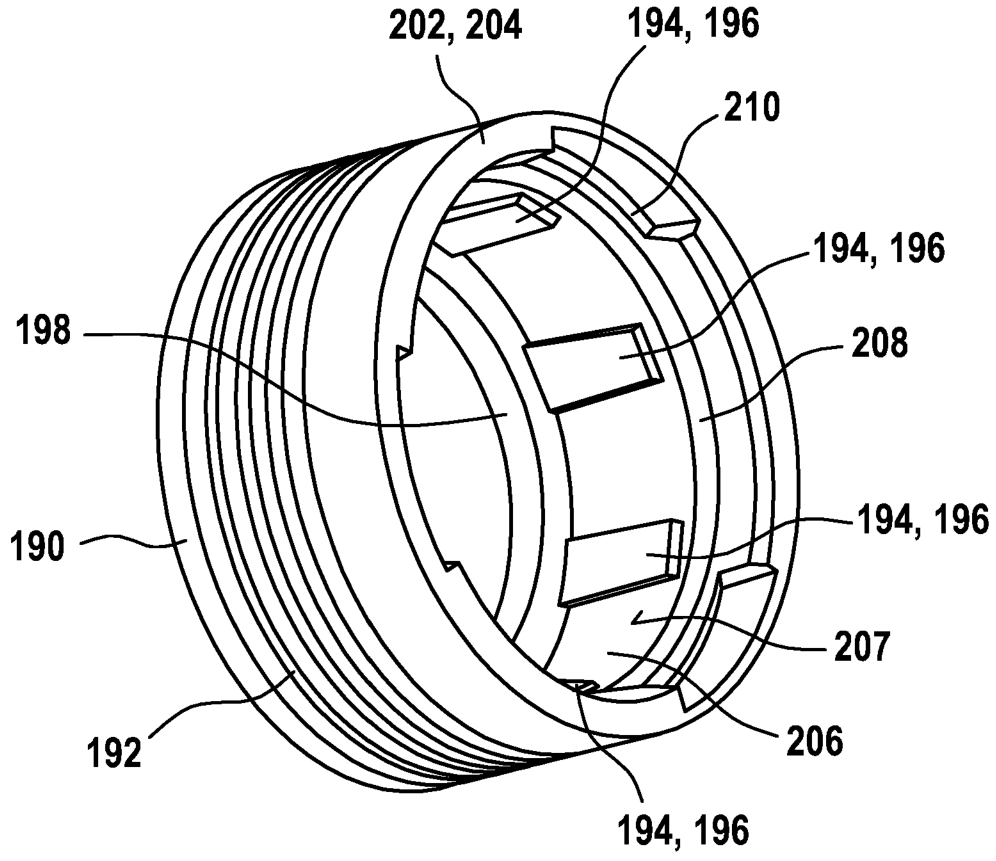
FIG. 4*c* shows a perspective view of an actuating element.

In this specific embodiment of the present invention, actuating element 190 encompasses a circumferential collar 198; see also FIG. 4*c*. Additionally, locking element 162 encompasses a circumferential shoulder 163; see also FIG. 4*a*. Shoulder 163 rests axially against collar 198. Collar 198 is formed as one piece with actuating element 190. Shoulder 163 is formed at locking element 162. Collar 198 and shoulder 163 are designed to be matching, in particular complementary, so that they are form-lockingly connectable to one another.

Locking unit 160 includes a fastening element 200. Support element 180 and actuating element 190 form a clamping connection with the aid of fastening element 200. Fastening element 200 is designed as a metal C-ring. Support element 180 is clamped between fastening element 200 and actuating element 190. In addition, fastening element 200 fixes support element 180 at actuating element 190, so that support element 180 rests against actuating element 190. In this specific embodiment, actuating element 190 accommodates fastening element 200 in a form-locking manner, in order to form the clamping connection. In addition, actuating element 190 encompasses fixing elements 202, in order to axially fix fastening element 200; see also FIG. 4*c*. Fixing elements 202 are designed as three projections 204.

Actuating element 190 encompasses a first internal holder 206 for accommodating locking element 162, a second internal holder 208 for accommodating support element 180, and a third internal holder 210 for accommodating fastening element 200; see also FIG. 4*c*. First internal holder 206 is formed as an internal holder surface 207, first internal holder 206 additionally forming mounting elements 194. Second internal holder 208 is formed as a circumferential groove. Additionally, second internal holder 208 forms a circumferential shoulder. Support element 180 is accommodated by the groove of second internal holder 208 and rests against the shoulder of second internal holder 208. As a result, support element 180 rests against actuating element 190 radially as well as axially with the aid of second internal holder 208. Third internal holder 210 is formed as a circumferential groove. Fastening element 200 is accommodated by third internal holder 210 and is axially fixed with the aid of fixing elements 202.

In FIG. 3, an exploded view of tool holder 150 is shown including locking unit 160 of hand-held power tool 100. Output shaft 124 additionally encompasses a shaft seal 212, a sliding bearing 214, and an axial spacer element 216. A perspective view of locking element 162 is represented in FIG. 4*a*, FIG. 4*b* showing a perspective view of support element 180. In FIG. 4*c*, a perspective view of actuating element 190 is shown.

Figure 5:
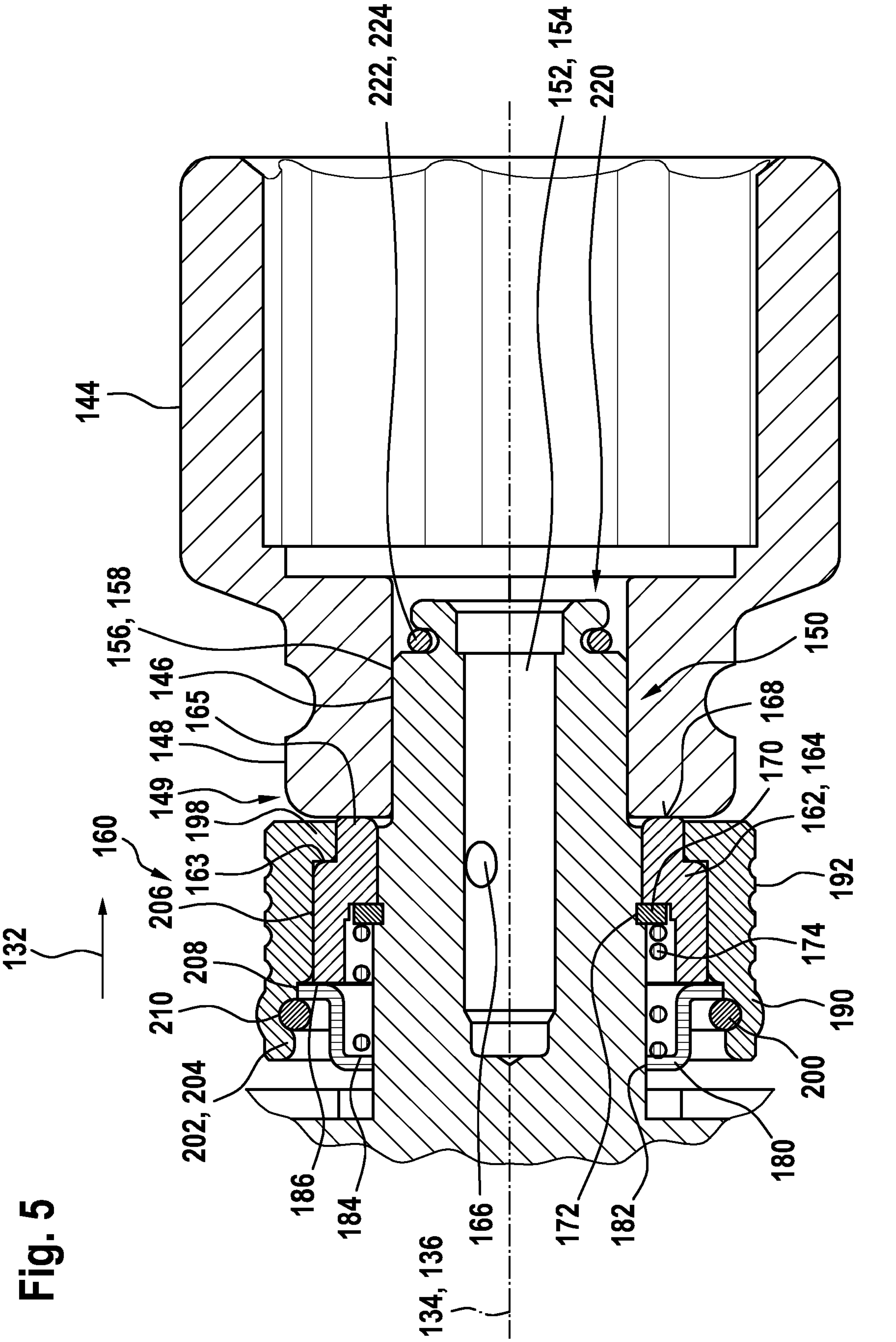
FIG. 5 shows a sectional view of the tool holder including a second insertion tool.

In FIG. 5, a sectional view of tool holder 150 is shown in a state connected to second insertion tool 144. In order to connect second insertion tool 144 to external polygonal holder 156, 158, second insertion tool 144 encompasses a connecting element 148. Connecting element 148 is formed at a back end 149 of second insertion tool 144. In the connected state, second insertion tool 144 rests directly against contact surface 168 of locking element 162.

What is claimed is:

1. A hand-held power tool, comprising:

a drive unit;

an output shaft at which a tool holder is formed, the tool holder including an internal polygonal holder for connection to a first insertion tool and an external polygonal holder for connection to a second insertion tool, a locking unit configured for locking the first insertion tool being assigned to the tool holder; and a striking mechanism connected to a drive element, wherein the striking mechanism encompasses an impact body which is configured to impart an impact to the output shaft;

wherein the locking unit includes at least one locking element, the locking element including at least one contact surface which axially supports the second insertion tool, wherein the locking unit includes at least one actuating element which accommodates the locking element in a form-locked manner, wherein the actuating element encompasses at least one first internal holder for accommodating the locking element, a second internal holder for accommodating a support element, and a third internal holder for accommodating a fastening element, wherein the actuating element includes an at least partially circumferential collar, and the locking element includes an at least partially circumferential shoulder, the shoulder resting axially against the collar, wherein the actuating element at least partially accommodates the fastening element to form a clamping connection, the fastening element clamping the support element onto the actuating element and fixing the locking element, wherein at least one section of the locking element at least partially projects over the actuating element in an axial direction pointing away from the drive unit;

wherein, in a connected state, the second insertion tool rests directly against the at least one contact surface of the locking element.

2. The hand-held power tool as recited in claim 1, wherein the locking element radially locks the first insertion tool and the second insertion tool rests axially against the locking element.

3. The hand-held power tool as recited in claim 1, wherein the locking unit includes at least one setting element, against which the locking element rests and which guides axial forces into the output shaft.

4. The hand-held power tool as recited in claim 3, wherein the locking unit includes at least one return element, the return element resting axially against the setting element, and the return element returns at least the locking element from an unlocking position, in which the first insertion tool is unlockable, into a locking position, in which the first insertion tool is lockable.

5. The hand-held power tool as recited in claim 4, wherein the return element is a spring element.

6. The hand-held power tool as recited in claim 4, wherein the return element and the locking element rest against the support element.

7. The hand-held power tool as recited in claim 6, wherein the support element is a support sheet.

8. The hand-held power tool as recited in claim 6, wherein the support element is in the shape of a cup.

9. The hand-help power tool as recited in claim 8, wherein the support element is a support sheet.

10. The hand-held power tool as recited in claim 1, wherein the support element and the actuating element form the clamping connection using the fastening element of the locking unit.

11. The hand-held power tool as recited in claim 10, wherein the fastening element rests against the support element.

12. The hand-held power tool as recited in claim 1, further comprising:

a rotary percussion unit having a length of maximally 140 mm, the rotary percussion unit including the drive unit, the striking mechanism, and the locking unit.

13. The hand-held power tool as recited in claim 12, wherein the rotary percussion unit has a length of maximally 130 mm.

14. The hand-held power tool as recited in claim 12, wherein the rotary percussion unit has a length of maximally 120 mm.

* * * * *